(12) United States Patent
Utter et al.

(10) Patent No.: US 6,479,908 B1
(45) Date of Patent: Nov. 12, 2002

(54) APPARATUS AND METHOD FOR SENSING POSITIONS OF AN IGNITION SWITCH

(75) Inventors: Thomas E. Utter, Royal Oak, MI (US); Carol L. Daprai, Lake Orion, MI (US); Kerfegar K. Katrak, Fenton, MI (US); David T. Proefke, Madison Heights, MI (US); Thomas M. Forest, Macomb, MI (US); Michael J. Kachman, Ray Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/552,774

(22) Filed: Apr. 20, 2000

(51) Int. Cl.⁷ .............................................. B60R 25/04
(52) U.S. Cl. ................................ 307/10.3; 307/10.6
(58) Field of Search ............................. 307/10.2, 10.3, 307/10.6

(56) References Cited

U.S. PATENT DOCUMENTS

| | | |
|---|---|---|
| 1,701,476 A | 2/1929 | Miller |
| 1,717,285 A | 6/1929 | Vickery et al. |
| 2,570,838 A | 10/1951 | Nathan et al. ................. 240/10 |
| 3,627,937 A | 12/1971 | Swanke et al. ................ 200/38 |
| 4,163,879 A | 8/1979 | Mayer et al. .................. 200/11 |
| 4,425,770 A | 1/1984 | Mentani et al. ................ 70/252 |
| 4,803,460 A | 2/1989 | Rhee et al. .................... 340/63 |
| 4,987,756 A | 1/1991 | Fancher ....................... 70/186 |
| 5,066,941 A | 11/1991 | Lau ............................ 340/457 |
| 5,219,397 A | 6/1993 | Jones .......................... 123/179 |
| 5,376,763 A | 12/1994 | Watari .......................... 200/11 |
| 5,481,253 A | 1/1996 | Phelan et al. ................ 340/825 |
| 5,555,863 A | 9/1996 | Kokubu ....................... 123/179 |
| 6,181,026 B1 * | 1/2001 | Treharne et al. ........... 307/10.3 |

* cited by examiner

Primary Examiner—Jeffrey Sterrett
(74) Attorney, Agent, or Firm—Anthony Luke Simon (57) ABSTRACT

An ignition switch sensor having a plurality of contacts arranged on a sensor to make intermittent contact with a movable contact and generate a first plurality of outputs corresponding to the position of the movable contact relative to the plurality of contacts. A power mode module receives the first plurality of outputs and compares the outputs to data stored within the memory of the module and provides a second plurality outputs according to the value of the first plurality of outputs. A theft resistor may be integrated into the ignition switch sensor circuitry to facilitate protection from tampering and unauthorized starting of the vehicle's engine.

20 Claims, 9 Drawing Sheets

| ERF | Run/Crank (C) | Accessory (B) | Off/Run/Crank (A) | Failsoft | Power Mode |
|---|---|---|---|---|---|
| False | 0 | 0 | 0 | 0 | OFF/RAP |
| False | 0 | 0 | 1 | 0 | OFF/RAP |
| False | 0 | 0 | R1 | 1 | RUN |
| False | 0 | 0 | R1+R2 | 1 | CRANK |
| False | 0 | 1 | 0 | 0 | ACCESSORY |
| False | 0 | 1 | 1 | 0 | ACCESSORY |
| False | 0 | 1 | R1 | 0 | RUN |
| False | 0 | 1 | R1+R2 | 1 | RUN |
| False | 1 | 0 | 0 | 1 | OFF<br>If Run/Crank (C)=0 & Acc(B)=1 & Off/Run/Crank. (A)=0 has <u>not</u> been encountered in the present ignition cycle |
| False | 1 | 0 | 0 | 1 | CRANK<br>If Run/Crank (C)=0 & Acc(B)=1 & Off/Run/Crank. (A)=0 has been encountered in the present ignition cycle |
| False | 1 | 0 | 1 | 1 | OFF<br>If Run/Crank (C)=0 & Acc(B)=1 & Off/Run/Crank. (A)=1 has <u>not</u> been encountered in the present ignition cycle |
| False | 1 | 0 | 1 | 1 | CRANK<br>If Run/Crank (C)=0 & Acc(B)=1 & Off/Run/Crank. (A)=1 has been encountered in the present ignition cycle |
| False | 1 | 0 | R1 | 1 | RUN |
| False | 1 | 0 | R1+R2 | 0 | CRANK |
| False | 1 | 1 | 0 | 1 | RUN |
| False | 1 | 1 | 1 | 1 | RUN |
| False | 1 | 1 | R1 | 0 | RUN |
| False | 1 | 1 | R1+R2 | 0<br>1* | CRANK |

\* Delayed code setting as normal signal and failure signal have similar input conditions

FIG.5A

| Position | Failure Mode | BCNC Code |
|---|---|---|
| Normal Off detent, Key-out of vehicle | | |
| Normal Off detent, Key-In vehicle | | |
| Between Accessory and Run detent | Only B open | B1382 |
| Start detent | Only C open | B1372 |
| Normal Accessory detent | | |
| Between Off and Accessory detent | | |
| Between Accessory and Run detent | | |
| Between Run and Start detent | Only C open | B1372 |
| Off detent without Key in ignition Switch | Only C shorted to B+ | B1373 |
| Start detent | Only A open | B1442 |
| Off detent with Key in ignition switch | Only C shorted to B+ | B1373 |
| Start detent | Only A shorted to B+ | B1443 |
| Run detent | Only B open | B1382 |
| Normal Start detent | | |
| Run detent OR Normal Accessory detent | Only A open Only C shorted to B+ | No code Set |
| Run detent OR Between Off and Accessory detent | Only A shorted to B+ Only C shorted to B+ | No code Set |
| Normal Run detent | | |
| Between Run and Start detent Start detent | Only B shorted to B+ | B1383 |

| ERF | Run/Crank (C) | Accessory (B) | Off/Run/Crank (A) | Failsoft | Power Mode |
|---|---|---|---|---|---|
| True | 0 | 0 | 0 | 0 | OFF/RAP |
| True | 0 | 0 | 1 | 0 | OFF/RAP |
| True | 0 | 0 | R1 | 1 | RUN |
| True | 0 | 0 | R1+R2 | 1 | RUN |
| True | 0 | 1 | 0 | 0 | ACCESSORY |
| True | 0 | 1 | 1 | 0 | ACCESSORY |
| True | 0 | 1 | R1 | 0 | RUN |
| True | 0 | 1 | R1+R2 | 1 | RUN |
| True | 1 | 0 | 0 | 1 | RUN<br>If Run/Crank (C)=1 & Acc(B)=0 & Off/Run/Crank. (A)=1 has not been encountered in the present ignition cycle |
| True | 1 | 0 | 0 | 1 | OFF<br>If Run/Crank (C)=1 & Acc(B)=0 & Off/Run/Crank. (A)=1 has been encountered in the present ignition cycle |
| True | 1 | 0 | 1 | 1 | RUN<br>If Run/Crank (C)=1 & Acc(B)=1 & Off/Run/Crank. (A)=0 has not been encountered in the present ignition cycle |
| True | 1 | 0 | 1 | 1 | OFF<br>If Run/Crank (C)=1 & Acc(B)=1 & Off/Run/Crank. (A)=0 has been encountered in the present ignition cycle |
| True | 1 | 0 | R1 | 1 | RUN |
| True | 1 | 0 | R1+R2 | 0 | RUN |
| True | 1 | 1 | 0 | 1 | RUN |
| True | 1 | 1 | 1 | 1 | RUN |
| True | 1 | 1 | R1 | 0 | RUN |
| True | 1 | 1 | R1+R2 | 0<br>1* | RUN |

\* Delayed code setting as normal signal and failure signal have similar input conditions

FIG.6A

| Position | Failure Mode | BCNC Code |
|---|---|---|
| Loss of Battery at ignition switch | B+ open at ignition switch | B+ open at ignition switch |
| Normal Off detent, Key-In vehicle | | |
| Between Accessory and Run detent | Only B open | B1382 |
| Start detent | Only C open | B1372 |
| Normal Accessory detent | | |
| Between Off and Accessory detent | | |
| Between Accessory and Run detent | | |
| Between Run and Start detent | Only C open | B1372 |
| Start detent | Only A open | B1442 |
| Off detent without Key in ignition switch | Only C shorted to B+ | B1373 |
| Start detent | Only A shorted to B+ | B1443 |
| Off detent with Key in ignition switch | Only C shorted to B+ | B1373 |
| Run detent | Only B open | B1382 |
| Normal Start detent | | |
| Run detent OR Normal Accessory detent | Only A open Only C shorted to B+ | No code Set |
| Run detent OR Between Off and Accessory detent | Only A shorted to B+ Only C shorted to B+ | No code Set |
| Normal Run detent | | |
| Between Run and Start detent Start detent | Only B shorted to B+ | B1383 |

APPARATUS AND METHOD FOR SENSING POSITIONS OF AN IGNITION SWITCH

The present invention is related to a method and apparatus for providing an ignition switch status.

BACKGROUND OF THE INVENTION

Numerous devices have been conceived and/or employed in order to provide a means for facilitating the starting sequence of an automobile. In addition, and unfortunately, there has been a growing need for anti-theft devices to be incorporated into the automobile's control system.

However, and as technological advances have made the operational systems of automobiles more complex, there is also a growing need for simplistic alternatives which allow for enhanced performance while at the same time providing less expensive alternatives.

In addition, and as technological improvements are incorporated into electronic devices and more and more devices become reliant upon a single component, the failure of a single component may cause a cascading effect which will disable an entire system. Therefore, redundant pathways are employed to operate systems unaffected by a component failure. However, such redundancies become cost prohibitive.

Accordingly, there is a need for an ignition switch sensing device that provides detailed information corresponding to the relative position of a key as it is being relocated within an ignition cylinder. Moreover, there is also a need for device that provides such information with and economical means for providing design redundancies.

In addition, there is also a need for the incorporation of an anti-theft mechanism that can be efficiently incorporated into the sensing device.

SUMMARY OF THE INVENTION

In an exemplary embodiment a power mode module receives a plurality of inputs from a combination of circuits and utilizes a state table in order to determine the position of an ignition switch.

In another embodiment, the power mode module also determines what power mode a vehicle is in.

In an alternative embodiment, an ignition switch sensor is equipped with an anti-theft resistor that is broken when an unauthorized removal of the ignition switch takes place, and accordingly, the automobile's engine is prohibited from starting.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
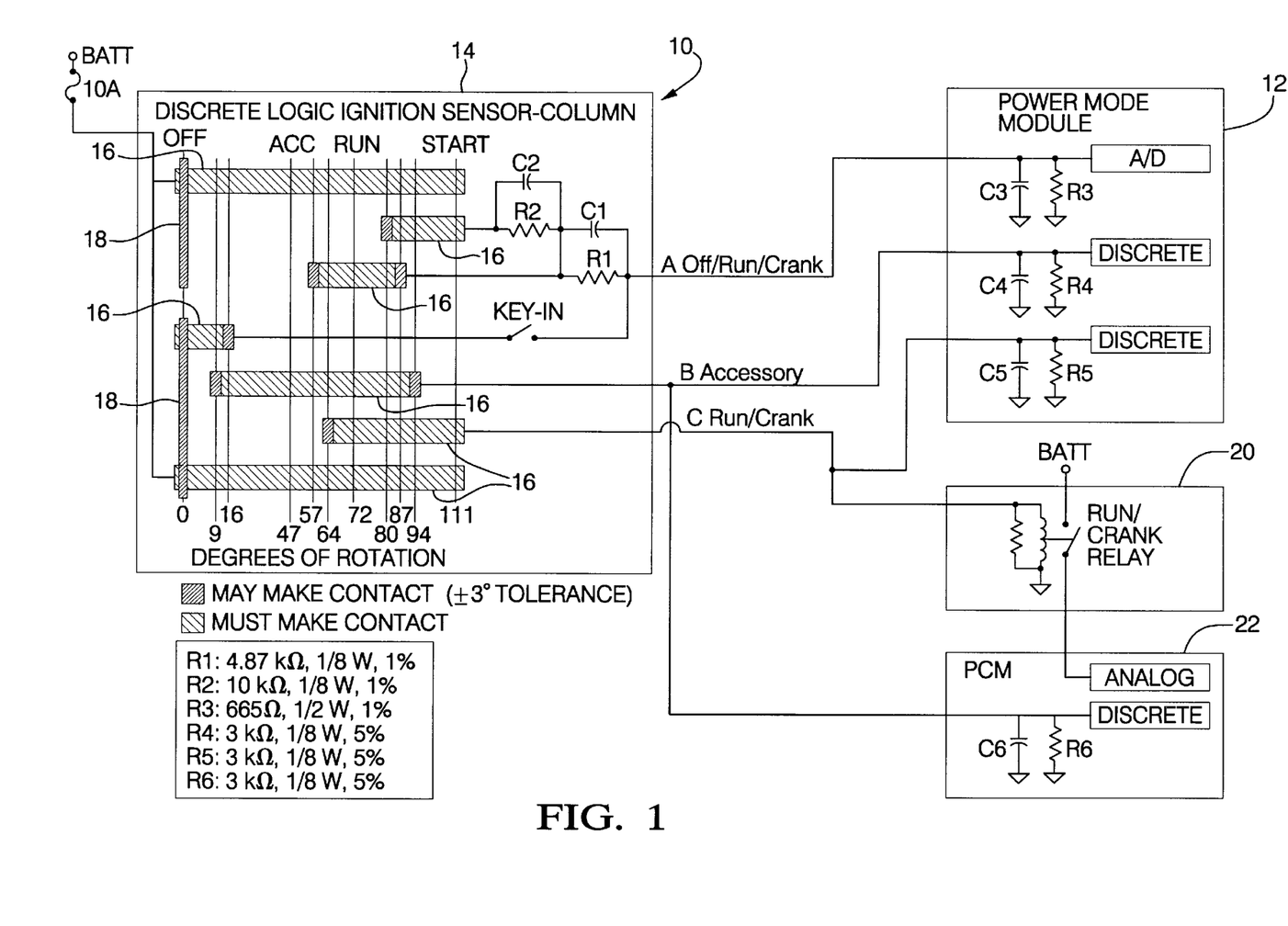
FIG. 1 is a schematic view of an ignition sensor constructed in accordance with a the present invention.

Referring now to FIG. 1, an illustration of a discrete logic ignition switch sensor 10 and its connection with a power mode module 12 is illustrated. Ignition switch sensor 10 as illustrated in FIG. 1, is configured for a column mounted ignition switch. Discrete logic ignition switch sensor 10 includes a switch contact pattern 14. Switch contact pattern 14 has a plurality of contacts 16 that are positioned to provide an ignition switch status according to the position of a moving contact 18. Moving contact 18 and switch contact pattern 14 are configured so that contact 18 will make intermittent contact with contact 16 as the position of contact 18 is altered according to the movement of an ignition switch (not shown).

Contacts 16 have a built-in tolerance indicating when contact 18 must make contact for the circuit to be complete.

Ignition switch sensor 10 provides three outputs indicated as A, B and C that correspond to the ignition switch position and/or status. Of course, it is contemplated that sensor 10 can be configured to have a lesser or greater amount of outputs. As indicated in FIG. 1, output A provides an off/run/crank status of the ignition switch. Output B relates to an accessory position and output C relates to a run/crank position.

Output A, B and C are received as inputs into power mode module 12. In an exemplary embodiment power mode module 12 is a vehicle mounted electronic body module.

In addition, outputs B and C are also received as inputs into a run/crank relay 20 and an engine control module 22 respectively.

Accordingly, the positioning of moving contact 18 relative to plurality of contacts 16 completes a circuit wherein information can be relayed to control module 12 and other components of a system into which ignition switch sensor 10 has been installed.

The power mode module (PMM) will be responsible for determining and broadcasting the system power mode by processing ignition switch signal states, monitoring the states of timers, and processing other discrete inputs.

Ignition system 10 is also equipped with a wakeup delay. When the PMM or any other module sends the bus a wake-up message, the PMM will not send the power mode message until the wake-up delay has expired. If the PMM wakes up the bus, this delay begins when the bus wake-up message is queued. If the PMM is awakened by the bus, this delay begins when the PMM detects the transition from bus-asleep to bus-awake.

Three signals (A, B and C) from the ignition sensor (off/run/crank, accessory and run/crank), battery voltage, door status and the engine run flag (ERF) status will be monitored by the PMM in order to determine the present power mode. All signals will be debounced before any demand can determine the actual system power mode.

All ignition switch signals (off/run/crank, accessory, and run/crank) will be processed by the PMM for determination of the system power mode and will be directly routed from the ignition switch to the PMM. All ignition switch signals will be consecutively sampled in a specific state for the duration of the ignition signal debounce time before all signals are deemed valid (debounced) by the PMM. Since all of the ignition switch contacts have the same bounce characteristics, all discrete ignition signal inputs to the PMM will be debounced with the same filter times.

In an exemplary embodiment, the PMM shall read all ignition signal inputs only when the battery voltage is between 6 volts and 26.5 volts. This will prevent invalid input readings during low voltages encountered during vehicle cranking. Of course, the PMM can be configured to read ignition signal inputs for other battery voltages.

In the FIG. 1 embodiment, output A (off/run/crank) ignition switch signal states are based on a ratiometric comparison to the battery voltage measured by the power mode master.

Switch contact portion 14 has degrees of rotation which correspond to the rotation of an ignition switch within the ignition cylinder.

Figure 2:
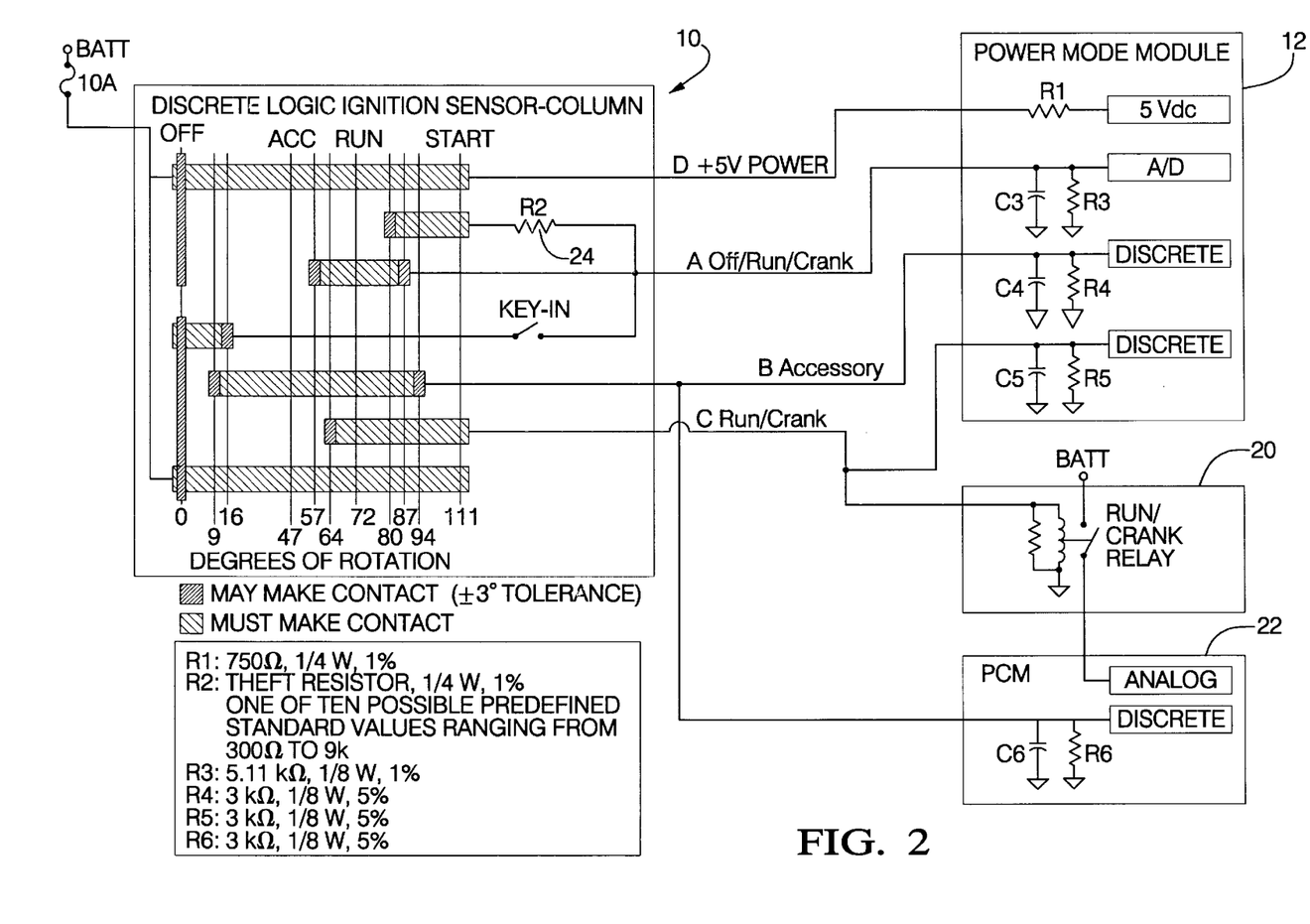
FIG. 2 is a schematic view of an alternative embodiment of the present invention.

Referring now to FIG. 2, an alternative of the present invention is illustrated. Here ignition switch sensor 10 is configured to have an anti-theft resistor 24. A mechanism (not shown) is configured to disconnect and destroy anti-theft resistor 24 if the ignition switch or ignition key cylinder is improperly removed from its location.

Accordingly, there is an integration of the anti-theft resistor into the switch mechanization. Therefore, when the theft resistor broken, there is no reading of the theft resistor value and there will be no authorization to start vehicle.

For example, if a theft of the vehicle is attempted and the ignition cylinder is removed from the steering column and/or dashboard the anti-theft resistor is broken. For example, if the cylinder is removed through a push or pull process or attempt to remove the cylinder without having a valid ignition key, there is a mechanism that breaks the theft resistor.

Since the anti-theft resistor is integrated directly into the switch, this allows for a significant cost savings when compared to prior systems having a separate sensor wherein an antitheft signal is generated.

In addition, an additional output D is provided by power mode module 12. Output D corresponds to a voltage reference for switch state determination.

Figure 3:
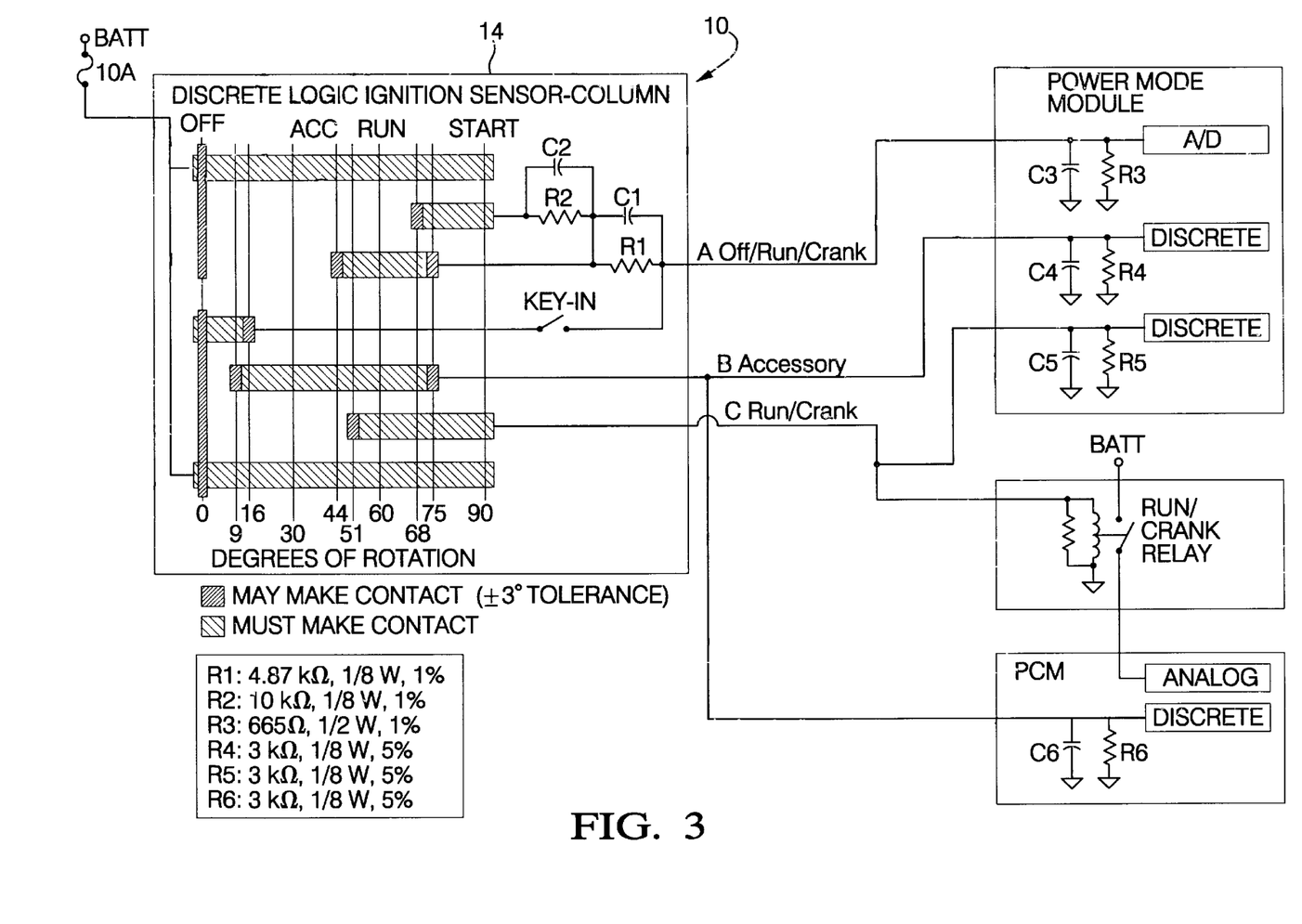
FIG. 3 is a schematic view of another alternative embodiment of the present invention.

Referring now to FIG. 3, another alternative embodiment is illustrated. Here an ignition switch sensor 10 for an instrument panel mounted ignition switch is illustrated. The component parts of the FIG. 3 embodiment are similar to those illustrated in FIG. 1 however the degrees of rotation are different. Generally, there are lesser degrees of rotation required for an instrument panel mounted ignition switch due to ergonomic reasons.

Figure 4:
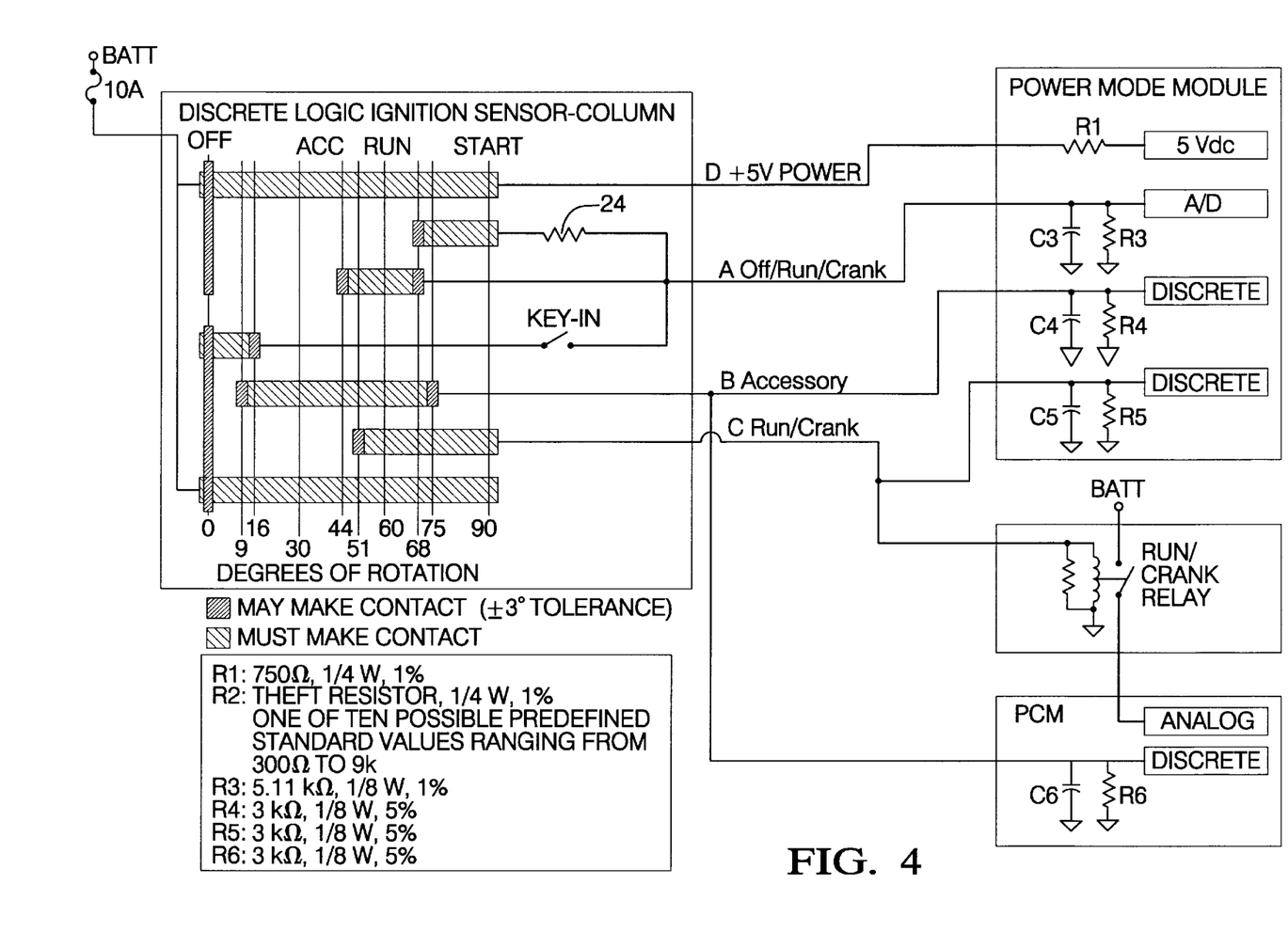
FIG. 4 is a schematic view of another alternative embodiment of the present invention.

Referring now to FIG. 4, another alternative embodiment is illustrated. Here an ignition switch sensor 10 including an anti-theft resistor 24 is illustrated. The component parts of the FIG. 4 embodiment are similar to those in FIG. 2 however the degrees of rotation are different as discussed immediately above with respect to FIG. 3.

Figure 5:
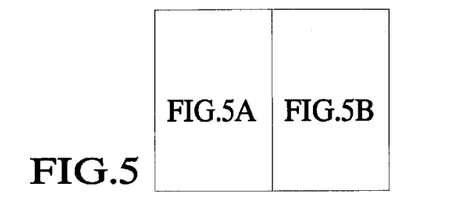
FIGS. 5, 5A, 5B, 6, 6A, and 6B are state tables indicating the power mode and ignition key position.
Figure 5A:
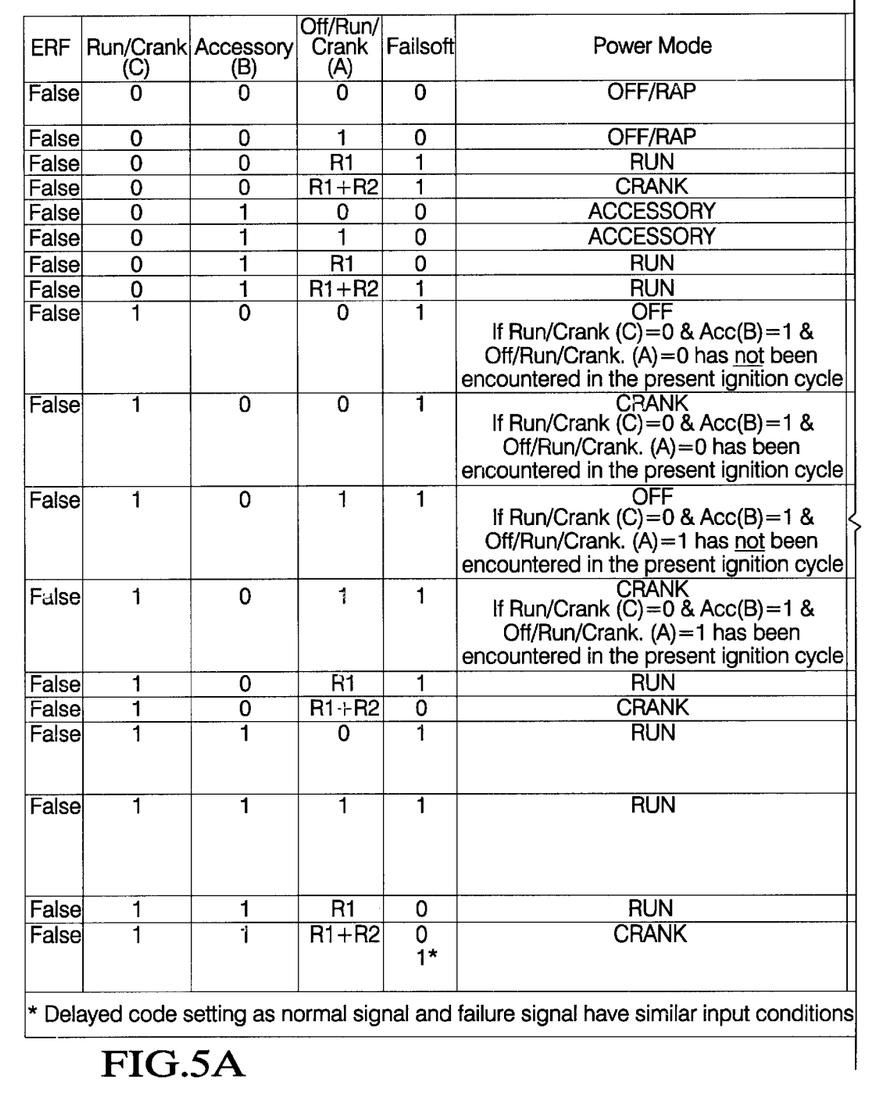
Figure 5B:
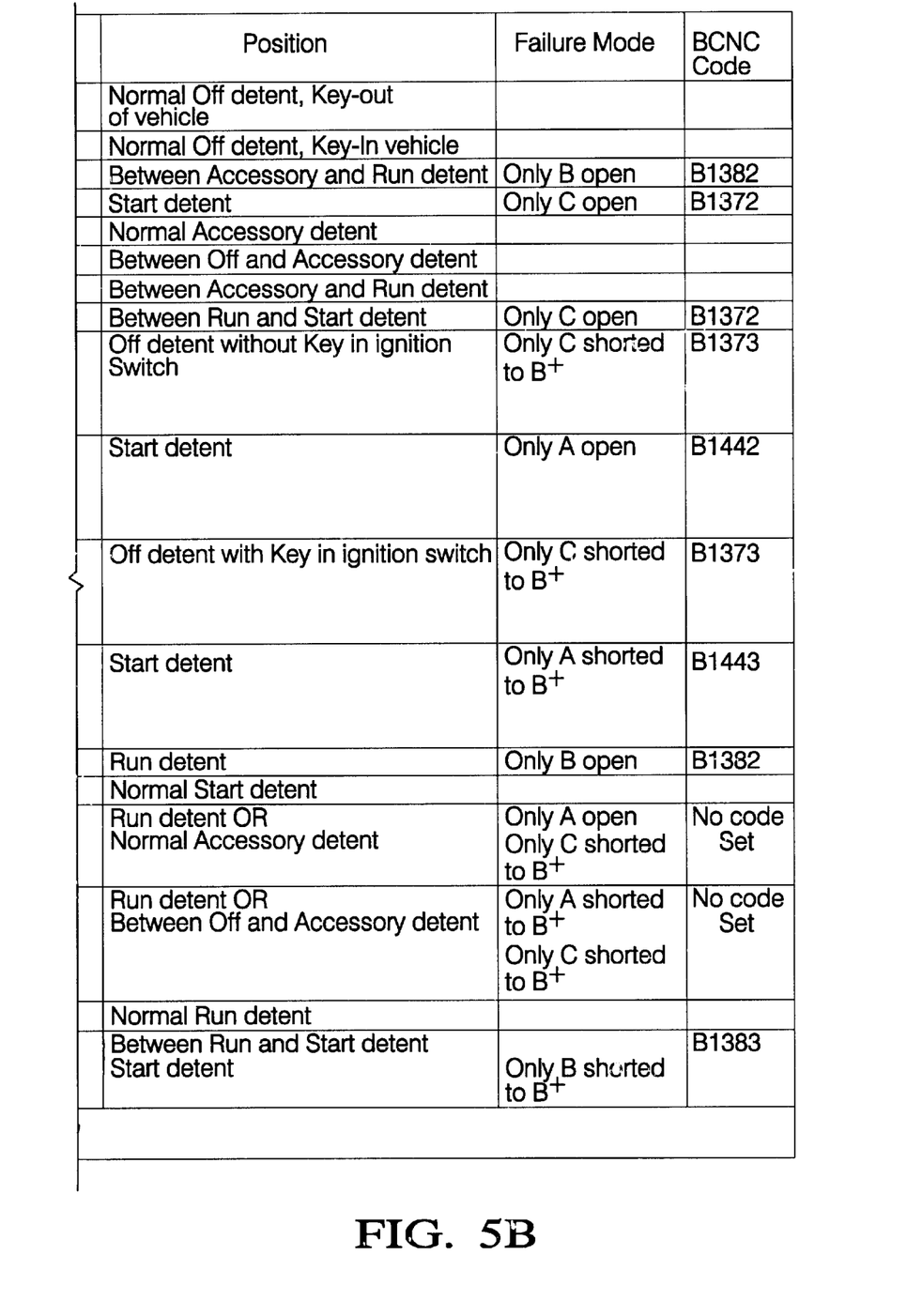
Figure 6:
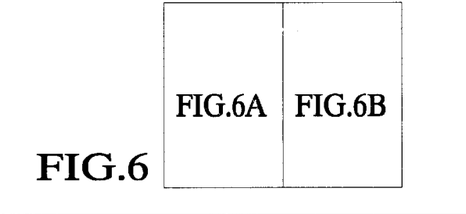
Figure 6A:
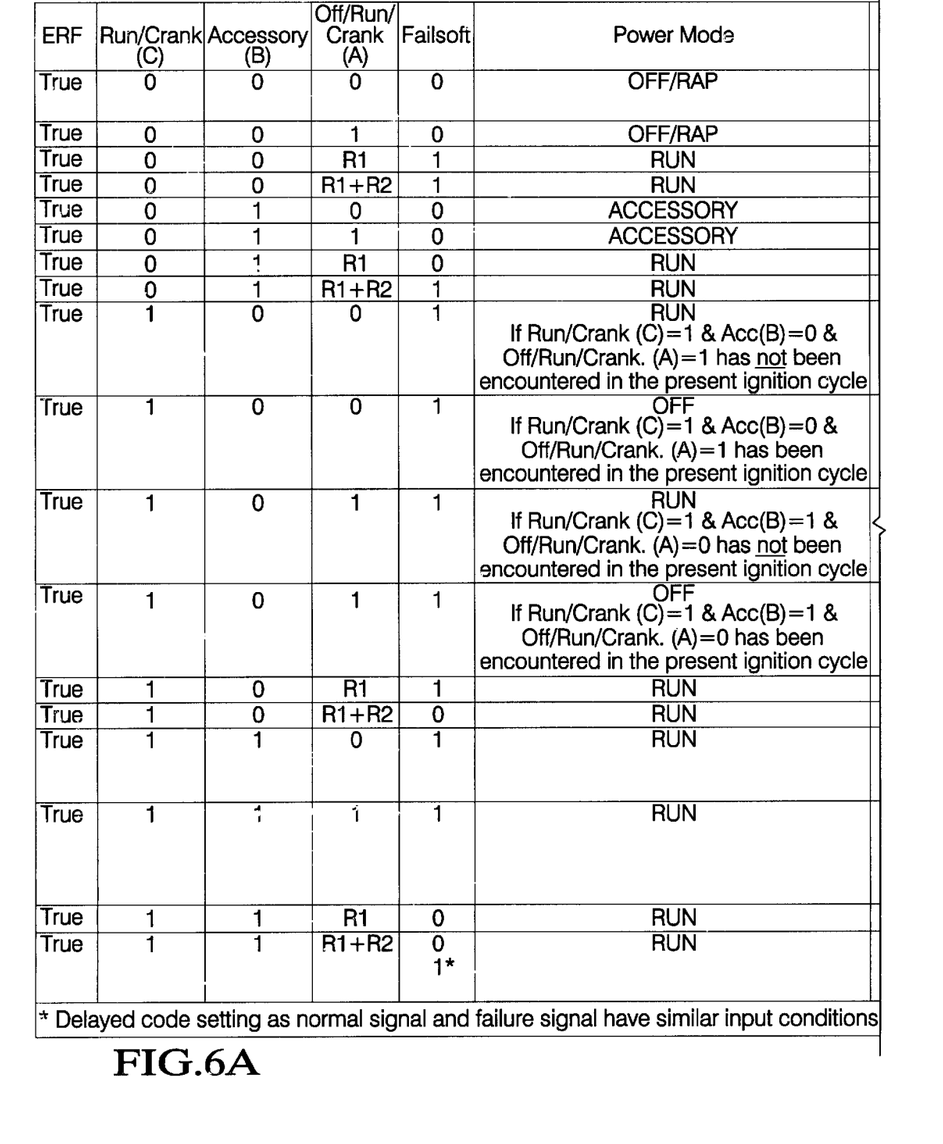
Figure 6B:
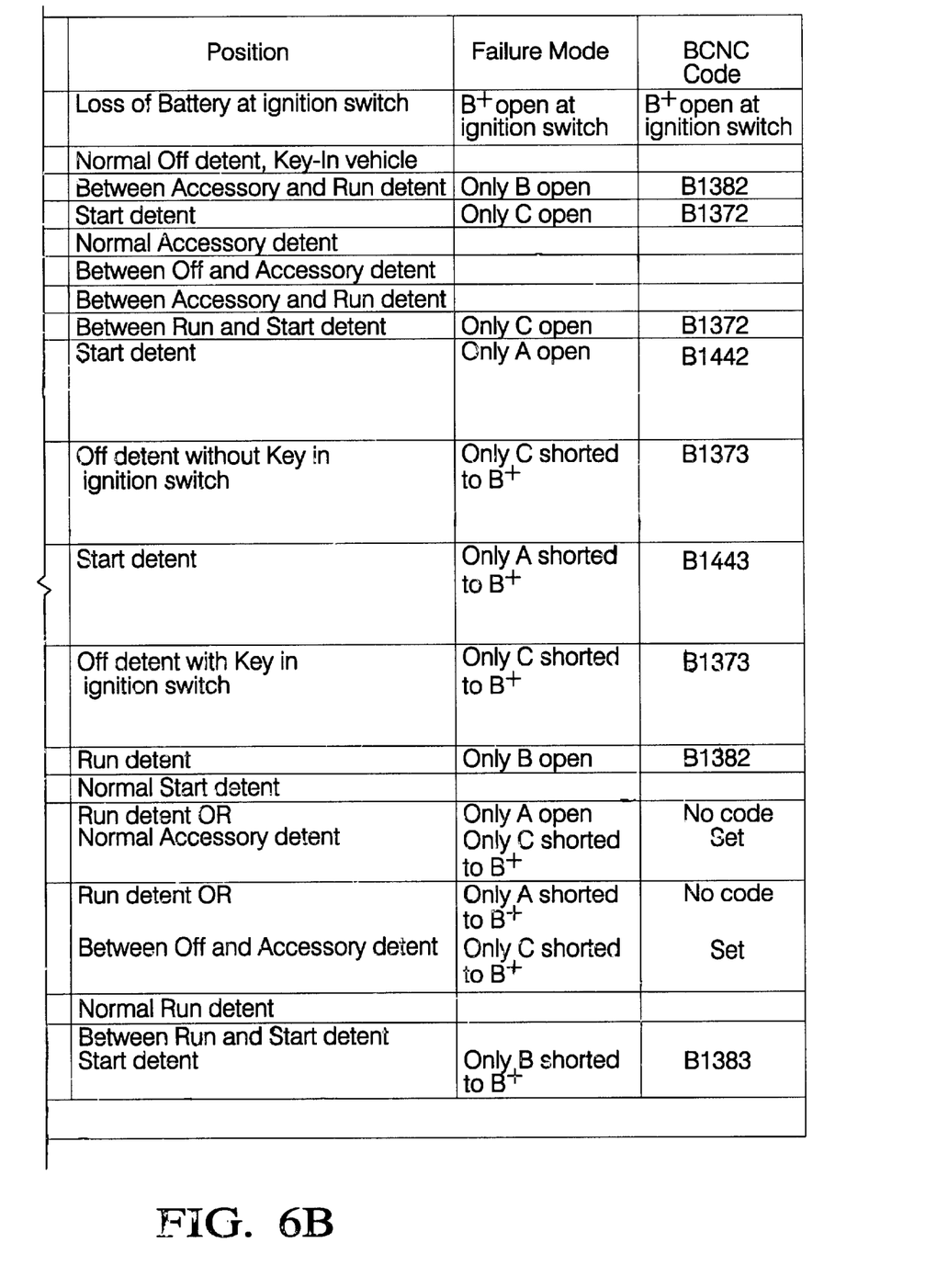

Referring now to FIGS. 5 and 6, the state tables for the output of ignition switch sensor 10 are illustrated. The state tables are included into the memory of power mode module 12. Of course, other implementations of the logical determination are possible.

Accordingly, three or more circuit inputs are being received by the power mode module that looks at a combination of those circuits to determine what position the key is in.

One benefit of the instant application is that there is a combination of circuits as opposed to a single circuit determining the key position. The combination of circuits allows for design redundancy wherein if one of the circuits fails the power mode module is still able to determine the key position by looking at the state table.

The control module has one or more analog and discrete inputs where it is reading three or four different signals and based upon the voltage levels it sees at these inputs and it determines what the ignition key position is and based upon that determination it will switch in one more relays to power mode the rest of the vehicle. The PMM conducts a ratiometric read on the inputs.

The control module also has the potential for sending out a serial data message to indicate what power mode the vehicle is in as well.

In addition, the accessory output of sensor 14 is also inputted into a power control module or engine control module 22. The run/crank output of sensor 14 is also input into a run/crank relay 24. The engine control module and the run/crank relay allow the engine and/or automobile accessories to be operated in the event of a failure within power mode module 12.

The engine run flag (ERF) indicates that the engine is running in the form of serial data from the powertrain control module to indicate whether it's running or not.

Accordingly, there is high reliability and less complexity than other ignition switch implementations. The entire unit costs less than prior systems because it has fewer contacts and fewer circuits.

The entire package is located within the ignition cylinder housing; the key-in switch, theft resistor and ignition circuits are integrated to reduce the number of circuits and package size. This also affects costs and reliability.

Accordingly, there is increased reliability due to the fact that there are fewer contacts and circuits, fewer moving parts, and software and hardware redundancies. In addition, use of an ignition switch logic state table reduces the sensor's sensitivity to contact positioning/tolerances.

Figure 7:
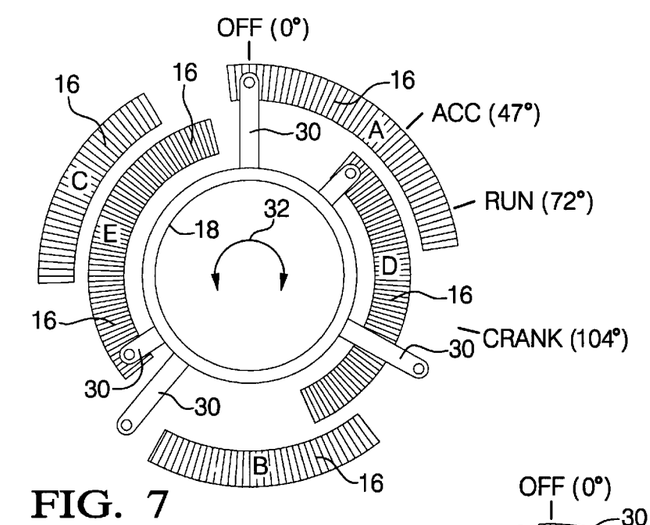
FIG. 7 is a top plan view of an ignition switch contact pattern.

Referring now to FIG. 7, a possible configuration of contacts 16 and movable contact 18 is illustrated. Here movable contact 18 as a plurality of contact portions 30 which make intermittent contact with contacts 16 as contact 18 is rotated in the direction indicated by arrow 32. Movable contact 18 can be integral to the sensor or be a component part of an ignition cylinder of an automobile.

Figure 8:
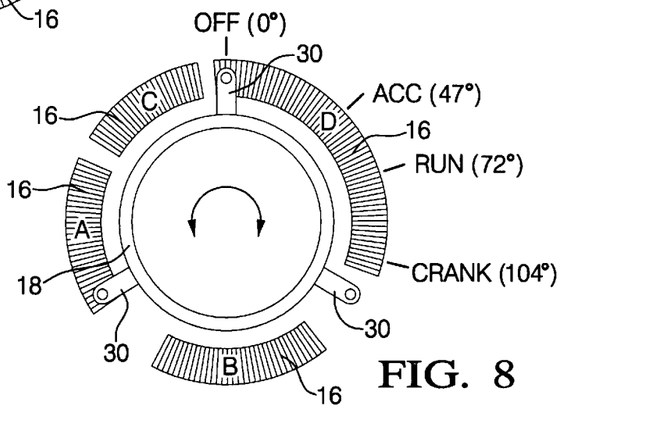
FIG. 8 is a top plan view of an alternative ignition switch contact pattern.

Referring now to FIG. 8, an alternative embodiment of the FIG. 7 embodiment is illustrated. Here the configuration of movable contact 18 is altered to provide a plurality of contact arms 30 each having a substantially similar size and length to correspond to a plurality of contacts 16 arranged in a circular configuration around movable contact 18.

Figure 9:
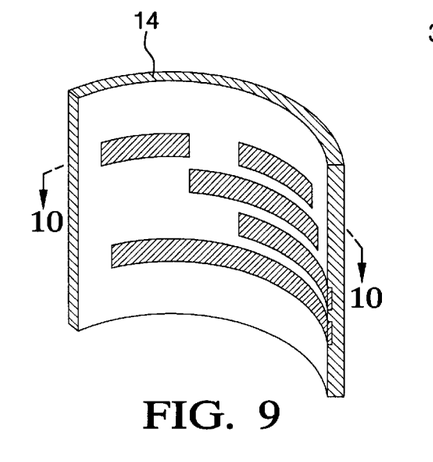
FIG. 9 is a perspective view of an alternative contact switch pattern.
Figure 10:
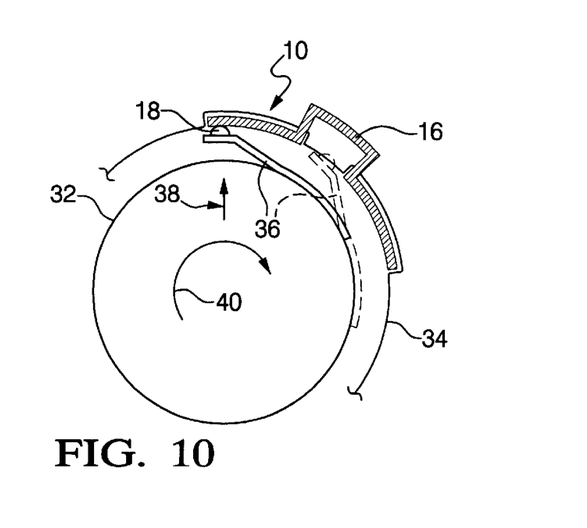
FIG. 10 is a cross-sectional to along the lines 10—10 of FIG. 9.

Referring now to FIGS. 9 and 10, yet another alternative to the FIG. 7 embodiment is illustrated. Here the ignition switch includes an inner cylinder 32. Inner cylinder 32 is configured, dimensioned and positioned for rotation within an outer cylinder 34.

Inner cylinder 32 has a contact arm 36 secured to the outer surface of inner cylinder 32. Contact arm 36 is fixedly secured to inner cylinder 32 at one end and movable contact 18 at the other. In addition, contact arm is provided to have a bias generally in the direction of arrow 38.

Switch circuit pattern 14 is positioned along the inner surface of outer cylinder 34. Accordingly, and as inner cylinder 32 is rotated in the direction of arrow 40, movable contact 18 will make contact with contact 16, however, and as illustrated by the dashed lines in FIG. 4, as movable contact reaches the break portion of contacts 16 there is no longer any contact between movable contact 18 and contact 16, and accordingly, this information is provided to control module 12.

As yet another alternative, movable contact 18 can be replaced or supplemented by a Hall effect sensor or potentiometric sensor.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An ignition switch, comprising:
   a plurality of contacts arranged on a sensor to make intermittent contact with a movable contact, said plurality of contacts and said movable contact being configured such that a first plurality of outputs are generated by the coupling of said movable contact and said plurality of contacts or the lack thereof, said first plurality of outputs corresponding to the position of said movable contact relative to said plurality of contacts, each of said first plurality of outputs being a discrete circuit combination; and
   a power mode module for receiving said first plurality of outputs, said power mode module comparing said first plurality of outputs to a state table stored in the memory of said power mode module, said state table providing input information which corresponds to the positioning of a key in an ignition switch, and said power mode module providing a second plurality outputs corresponding to the comparison of said first plurality of outputs to said state table, said state table being configured such that if one of the circuits in said discrete circuit combinations fails to provide an output signal, said power mode module is still able to determine and provide said second plurality outputs.

2. The ignition switch as in claim 1, further comprising:
   d) a relay for maintaining an operational status of an engine, said relay receiving one of said first plurality of outputs; and
   e) a power control module for receiving another one of said first and plurality of outputs and said power control module being electrically connected to said engine.

3. The ignition switch as in claim 1, further comprising:
   d) an anti-theft mechanism for providing an ignition switch status to a power mode module, said anti-theft mechanism is interrupted when unauthorized removal of said ignition switch occurs and said power mode module prevents an automobile from starting.

4. An ignition system for a vehicle, comprising:
   a movable member being adapted to be repositioned by the movement of a key inserted into an ignition switch, said movable member having a movable contact;
   an ignition switch sensor having a contact pattern adapted to make intermittent contact with said movable contact based upon a position of said movable member, contact or lack thereof of a first portion of said contact pattern and said movable contact providing a first signal, contact or lack thereof of a second portion of said contact pattern and said movable contact providing a second signal, and contact or lack thereof of a third portion of said contact pattern and said movable contact providing a third signal;
   a power mode module receiving said first, second and third signals, said power mode module comparing said first, second, and third signals to a state table, said power mode module generating an output depending on said first, second and third signals, wherein said power mode module is adapted to provide said output if one of said first, second, or third signals is not received;
   a power control module being adapted to also receive said second signal; and
   a run/crank relay being adapted to also receive said third signal, wherein said power control module and said run/crank relay are also configured to generate secondary outputs depending on said first and second signals if said power mode module does not generating said output.

5. The ignition system as in claim 4, wherein said power mode module receives said first, second and third signals only when a battery voltage reading is in a range defined by a lower limit of 6 volts and an upper limit of 26.5 volts.

6. The ignition system as in claim 5, further comprising:
   an anti-theft mechanism for providing an ignition switch status signal to said power mode module, said antitheft mechanism being a resistive element that is severed when unauthorized tampering of said ignition switch occurs, said anti-theft mechanism no longer allows a signal corresponding to the voltage drop of the resistive element to be received by said power mode module when severed, said power mode module interpreting the lack of said signal as an unauthorized use and prevents cranking of the vehicle by said power mode module or said run/crank relay.

7. A switch for controlling the operation of a vehicle, comprising:
   a) an ignition cylinder being configured and dimensioned to receive an ignition key, said ignition cylinder being capable of movement in a range defined by a first position and a second position when said ignition key is inserted into said ignition cylinder;
   b) a plurality of contacts arranged on a sensor to make intermittent contact with an ignition cylinder contact;
   c) a first plurality of outputs generated by said sensor, said first plurality of outputs corresponding to the position of said ignition cylinder and said ignition cylinder contact relative to said plurality of contacts;
   d) a power mode module for receiving said first plurality of outputs, said power mode module comparing said first plurality of outputs to data stored within the memory of said power mode module and said power mode module providing a second plurality outputs according to the value of said first plurality of outputs; and
   e) an anti-theft mechanism for providing an ignition switch status to said power mode module, said anti-theft mechanism being a resistive element that is severed when unauthorized removal of said ignition cylinder occurs, when severed said anti-theft mechanism no longer allows a signal corresponding to the voltage drop of the resistive element to be received by said power mode module when severed, the lack of said signal being interpreted by said power mode module as an unauthorized use where the starting of the automobile is prevented by said power mode module.

8. The switch as in claim 7, wherein said second plurality of outputs provide an operational protocol for said vehicle.

9. The switch as in claim 7, further comprising:
   f) a relay for maintaining an operational status of an engine, said relay receiving one of said first plurality of outputs; and
   g) a power control module for receiving another one of said first plurality of outputs and said power control module being electrically connected to an engine of said vehicle.

10. A switch for controlling the operation of a vehicle, comprising:
    a) an ignition cylinder being configured and dimensioned to receive an ignition key, said ignition cylinder being capable of movement in a range defined by a first position and a second position when said ignition key is inserted into said ignition cylinder;
    b) a sensor for determining the position of said ignition cylinder;
    c) a first plurality of outputs generated by said sensor, said first plurality of outputs corresponding to the position of said ignition cylinder; and
    d) a power mode module for receiving said first plurality of outputs and an engine run status of the vehicle, said power mode module comparing said first plurality of outputs to data stored within the memory of said power mode module and said power mode module providing a second plurality outputs according to the value of said first plurality of outputs and said engine run status, said engine run status being defined in a range of an off state or a running state, said second plurality outputs does not include a crank output when said engine run status is in said running state regardless of the value of said first plurality of outputs.

11. The switch as in claim 10, wherein said power mode module only receives said first plurality of outputs when a battery voltage reading is in a range defined by a lower limit of 6 volts and an upper limit of 26.5 volts.

12. The switch as in claim 10, wherein each of said first plurality of outputs is a discrete circuit combination, said state table being configured such that if one of the circuits in said discrete circuit combinations fails, said power mode module is still able to determine said second plurality outputs.

13. The switch as in claim 10, further comprising an anti-theft mechanism for providing an ignition switch status to said power mode module, said anti-theft mechanism being a resistive element that is severed when unauthorized removal of said ignition cylinder occurs, when severed said anti-theft mechanism no longer applies a resistive value to said sensor which is interpreted by said power mode module as an unauthorized use where the starting of the automobile is prevented by said power mode module.

14. A method of sensing an ignition switch position, said method comprising:
    a) arranging a plurality of contacts on a sensor, said plurality of contacts making intermittent contact with a movable contact;
    b) generating a first plurality of outputs corresponding to the position of said movable contact relative to said plurality of contacts;
    c) receiving said first plurality of outputs by a power mode module, said power mode module only receiving said first plurality of outputs when a battery voltage reading is in a range defined by a lower limit of 6 volts and an upper limit of 26.5 volts; and
    d) comparing said first plurality of outputs to data stored within the memory of said power mode module and said power mode module; and
    e) providing a second set of outputs according to the value of said first plurality of outputs, wherein said second plurality of outputs provide an operational protocol for said vehicle.

15. The method as in claim 14, wherein said movable contact is secured to an ignition switch cylinder for controlling an engine of a vehicle.

16. The method as in claim 14, further including:
    f) providing an antitheft mechanism which provides a signal to said power mode module, said signal indicating an authorization to proceed to said power mode module.

17. The method as in claim 16, wherein said antitheft mechanism is a resistor that is being broken when unauthorized tampering of said ignition cylinder occurs to prevent the production of said signal.

18. An ignition switch, comprising:
    a plurality of contacts arranged on a sensor to make intermittent contact with a movable contact, said plurality of contacts and said movable contact being configured such that a first plurality of outputs are generated by the coupling of said movable contact and said plurality of contacts or the lack thereof, said first plurality of outputs corresponding to the position of said movable contact relative to said plurality of contacts, each of said first plurality of outputs being a discrete circuit combination; and
    a power mode module for receiving said first plurality of outputs and an engine run status of the vehicle, said power mode module comparing said first plurality of outputs and said engine run status to a state table stored in the memory of said power mode module, said power mode module providing a second plurality outputs dependant upon said first plurality of outputs and said engine run status, said second plurality outputs corresponds to the positioning of a key in an ignition switch, said state table being configured such that said power mode module is still able to determine said second plurality outputs even if one of said first plurality of outputs has failed, said engine run status being defined in a range of an off state or a running state, said second plurality outputs does not include a crank output when said engine run status is in said running state regardless of the value of said first plurality of outputs.

19. The ignition switch as in claim 18, wherein said power mode module receives said first plurality of outputs only when a battery voltage reading is in a range defined by a lower limit of 6 volts and an upper limit of 26.5 volts.

20. The ignition switch as in claim 18, further comprising:
    an anti-theft mechanism for providing an ignition switch status to said power mode module, said antitheft mechanism being a resistive element that is severed when unauthorized tampering of said sensor occurs, said anti-theft mechanism no longer applies a resistive value to said power mode module when severed, said power mode module interpreting the lack of said resistive value as an unauthorized use and prevents starting of the automobile by said power mode module.

* * * * *